US012587874B2

(12) United States Patent
Au

(10) Patent No.: US 12,587,874 B2
(45) Date of Patent: Mar. 24, 2026

(54) WINDOW MOUNTED WIRELESS GATEWAY SYSTEM FABRICATION PROCESS

(71) Applicant: T-Mobile USA, Inc., Bellevue, WA (US)

(72) Inventor: Chad Au, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 175 days.

(21) Appl. No.: 18/531,225

(22) Filed: Dec. 6, 2023

(65) Prior Publication Data

US 2025/0193709 A1 Jun. 12, 2025

(51) Int. Cl.
| | |
|---|---|
| *H04W 24/06* | (2009.01) |
| *B32B 17/10* | (2006.01) |
| *B32B 27/08* | (2006.01) |
| *B32B 27/38* | (2006.01) |
| *B32B 37/24* | (2006.01) |
| *H02J 50/12* | (2016.01) |
| *H04B 10/073* | (2013.01) |
| *H04W 88/16* | (2009.01) |

(52) U.S. Cl.
CPC ............. *H04W 24/06* (2013.01); *B32B 17/10* (2013.01); *B32B 27/08* (2013.01); *B32B 27/38* (2013.01); *B32B 37/24* (2013.01); *H02J 50/12* (2016.02); *H04B 10/0731* (2013.01); *B32B 2307/412* (2013.01); *B32B 2457/00* (2013.01); *H04W 88/16* (2013.01)

(58) Field of Classification Search
CPC .......... B32B 27/08; B32B 17/10; H02J 50/12; H04W 24/06
See application file for complete search history.

(56) References Cited

U.S. PATENT DOCUMENTS

| | | | | |
|---|---|---|---|---|
| 10,644,810 | B2 * | 5/2020 | Au | ......................... H04B 10/90 |
| 2008/0267112 | A1 * | 10/2008 | Lucidarme | ........... H04B 7/1555 |
| | | | | 370/315 |
| 2018/0294866 | A1 | 10/2018 | Ashworth | |
| 2020/0204212 | A1 * | 6/2020 | Fawcett | ............... H04B 10/116 |
| 2020/0244362 | A1 | 7/2020 | Ashrafi | |

OTHER PUBLICATIONS

Search Report for European Application No. 24217641.0, Dated May 7, 2025, 6 pages.

* cited by examiner

*Primary Examiner* — Vishal I Patel

(74) *Attorney, Agent, or Firm* — Lee & Hayes, P.C.

(57) ABSTRACT

A method for fabricating a window mounted Wi-Fi gateway system, where the method comprises orienting a transparent and substantially flat platform in a horizontal orientation, applying transparent sheet material to each side of the platform, placing first and second optical couplers (OC) perpendicularly on opposing sides of the transparent sheet material, placing a first form on first transparent sheet material, depositing a first stabilizer material within the first form, and turning the platform over a first time. The method further comprises placing a second form on second transparent sheet material wherein the first form and the second form are substantially aligned with each other, depositing a second stabilizer material within the first form, attaching wireless power coils to the second stabilizer material, turning the platform over a second time, attaching wireless power coils to the first stabilizer material, removing the transparent sheet material from the platform, and removing the forms.

10 Claims, 9 Drawing Sheets

Figure 6A:
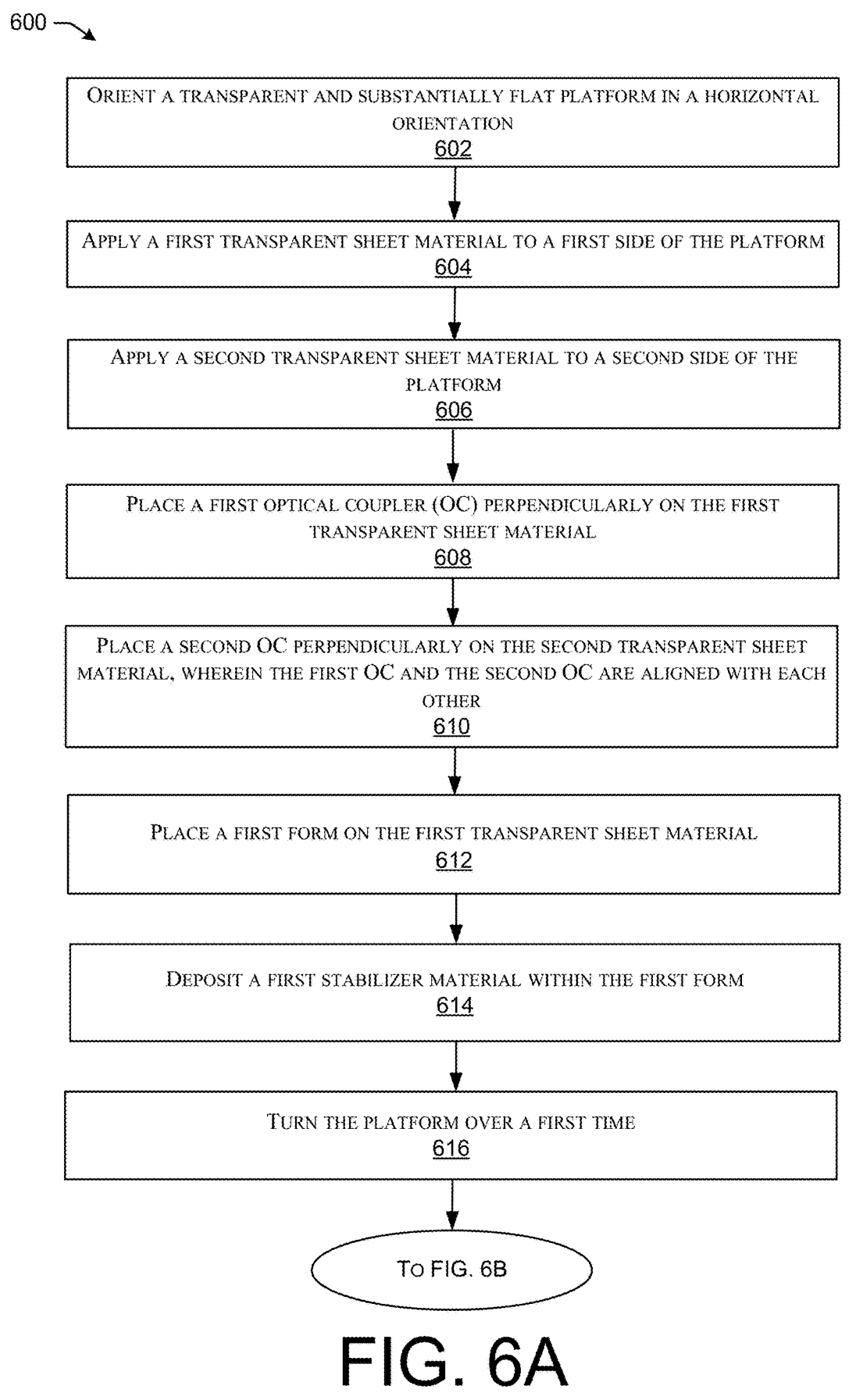

600 —↘

ORIENT A TRANSPARENT AND SUBSTANTIALLY FLAT PLATFORM IN A HORIZONTAL
ORIENTATION
602

↓

APPLY A FIRST TRANSPARENT SHEET MATERIAL TO A FIRST SIDE OF THE PLATFORM
604

↓

APPLY A SECOND TRANSPARENT SHEET MATERIAL TO A SECOND SIDE OF THE
PLATFORM
606

↓

PLACE A FIRST OPTICAL COUPLER (OC) PERPENDICULARLY ON THE FIRST
TRANSPARENT SHEET MATERIAL
608

↓

PLACE A SECOND OC PERPENDICULARLY ON THE SECOND TRANSPARENT SHEET
MATERIAL, WHEREIN THE FIRST OC AND THE SECOND OC ARE ALIGNED WITH EACH
OTHER
610

↓

PLACE A FIRST FORM ON THE FIRST TRANSPARENT SHEET MATERIAL
612

↓

DEPOSIT A FIRST STABILIZER MATERIAL WITHIN THE FIRST FORM
614

↓

TURN THE PLATFORM OVER A FIRST TIME
616

WINDOW MOUNTED WIRELESS GATEWAY SYSTEM FABRICATION PROCESS

BACKGROUND

Today many mobile network operators provide high speed wireless internet services to their customers. One concern with mobile network internet services is that customers may experience a degradation of service when in an indoor environment. For instance, structures and walls of a building or home may often attenuate radio signals as the radio signals propagate or pass through. In some cases, customers may deploy outdoor radio frequency repeaters to amplify the radio signals to compensate for the expected attenuation. The outdoor repeater, while emitting an amplified signal, also creates interference for those outdoor users operating on the same frequency. Unfortunately, the radio frequency repeaters often retransmit entire frequency bands and can cause interference with a desired spectrum associated with wireless internet services, thereby reducing reception in outdoor environments. In this manner, the customer often has to choose between poor indoor service or poor outdoor services with respect to their properties. In another instance, the repeater may be placed indoors. However, the indoor signal's quality will have then be degraded, with the repeater amplifying a poor-quality signal having low throughput. It is also possible the indoor signal will be degraded to the point where it is incoherent, resulting in the repeater amplifying noise.

A window mounted wireless (wireless standard) gateway system for mitigating radio frequency (RF) signal degradation or attenuation experienced in an indoor environment without introducing interference that may attenuate or degrade outdoor RF signals had been developed. In some cases, a mobile network may provide a wireless internet service via RF signals over a licensed or desired RF spectrum. For example, in some situations, building materials and structures, such as walls, may attenuate the RF signals. The attenuation may cause a degradation of mobile wireless service provided by a mobile network using RF technologies, particularly in the indoor environments. Such a window mounted Wi-Fi gateway system may include two paired units. The first unit may be configured for outdoor use, such as on the exterior of a window, and the second unit may be configured for indoor use, such as on the interior of the window. The outdoor unit may be aligned with the indoor unit, such that the units may communicate with each other via an optical transmission through the windowpane.

Functionality of the window mounted Wi-Fi gateway system depends entirely on having its optical couplers (OC) and wireless power coupler aligned properly between its outdoor unit (ODU) and indoor unit (IDU) when installed on a window. The form factor of the ODU and IDU consists of unit housings that can be easily handled, having a protective cover to protect it from the elements, with a base plate that is installed up against the window.

When fabricating these units, alignment of the optical couplers and wireless power coupler is uniquely adjusted for each pair. Once perfected, that alignment must then be transferred into their respective housings correctly during the manufacturing process so that the user may properly install this device. If the internal components are not properly integrated into their housing, the window mounted Wi-Fi gateway system will not function. The intended method of installation is to be completed without tools, modification to the window, or training.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 6A and 6B are a flow diagram illustrating an example process associated with a window mounted wireless gateway system, according to some implementations.

DETAILED DESCRIPTION

Figure 1:
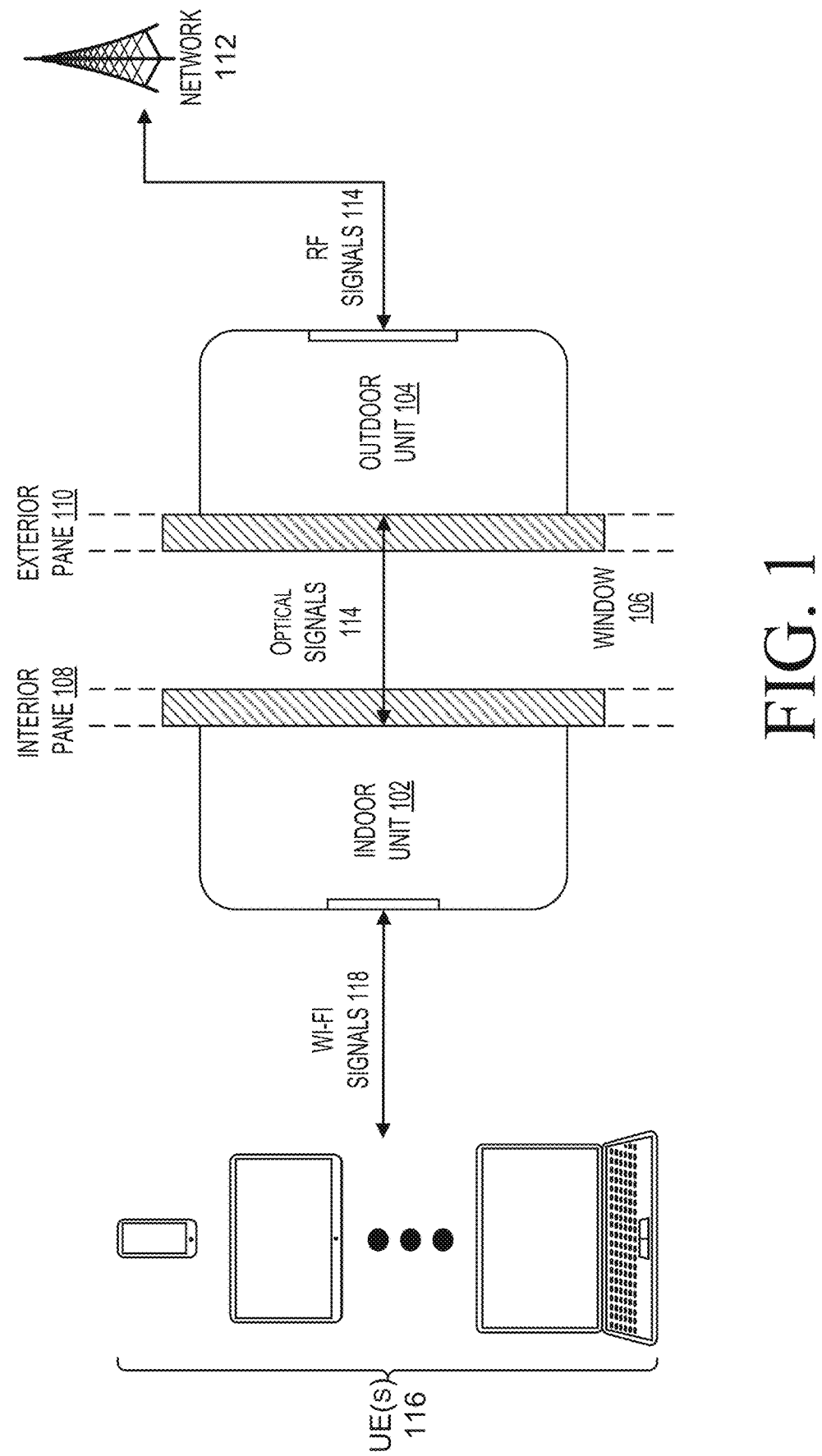
FIG. 1 is an example block diagram of an architecture for a window mounted wireless gateway system, according to some implementations.

Described herein is a fabrication process for window mounted Wi-Fi gateway systems. The fabrication process that provides alignment of the optical couplers and wireless power coupler that is uniquely adjusted for each pair. Once perfected, that alignment is then transferred into their respective housings correctly during the manufacturing process so that a user may properly install this window mounted Wi-Fi gateway system. The intended method of installation may be completed without tools, modification to the window, or training.

In general, as previously noted, a window mounted Wi-Fi gateway system for mitigating radio frequency (RF) signal degradation or attenuation experienced in an indoor environment without introducing interference that may attenuate or degrade outdoor RF signals. In some cases, a mobile network may provide a wireless internet service via RF signals over a licensed or desired RF spectrum. For example, in some situations, building materials and structures, such as walls, may attenuate the RF signals. The attenuation may cause a degradation of mobile wireless service provided by a mobile network using RF technologies, particularly in the indoor environments.

In implementations, the window mounted Wi-Fi gateway system may include two paired units. The first unit may be configured for outdoor use, such as on the exterior of a window, and the second unit may be configured for indoor use, such as on the interior of the window. The outdoor unit may be aligned with the indoor unit, such that the units may communicate with each other via an optical transmission through the windowpane. As an illustrative example, the outdoor unit may include one or more antennas and a wireless modem for receiving and decoding the RF signals (e.g., the network wireless transmission broadcast, for instance, from one or more network towers, small cells, or other wireless network infrastructure). The system may convert the decoded RF signals into an optical-based signal that may be transmitted by a transmitter through the glass to an aligned or paired receiver in the indoor unit. The indoor unit may then convert the optical-based signal into a wired and/or wireless indoor signal which may be distributed throughout the indoor environment, via a router, to a user equipment (UE). The indoor unit may receive a wireless signal (such as a response signal) from the UE at the router within the indoor environment. The indoor unit may then convert the wireless signal to an optical-based signal and transmit through the windowpane back to a receiver in the outdoor unit. The outdoor unit may convert the optical-based signal to an RF signal and transmit or send the user's data packet to a destination over the network.

In this manner, unlike conventional RF repeaters that amplify the RF signals that may interfere with the spectrum associated with wireless internet services and may reduce reception in outdoor environments, the window mounted Wi-Fi gateway system provides for indoor home network or modem services without interfering with outdoor performance of the mobile network.

The fabrication process for window mounted Wi-Fi gateway systems, described herein, may begin by horizontally orienting a sheet of glass large enough to accommodate the footprint of the window mounted Wi-Fi gateway system, with some room to spare on all sides. The surface of the glass is referred to herein as the x-y plane. A sheet of transparent material, e.g., Gorilla® glass or a resin-based compound material, may be applied to the top and bottom sides of the glass in the x-y plane. In implementations, the size of this material is larger than the footprint of the window mounted Wi-Fi gateway system.

One or more optical coupler (OC) pair(s) may be placed perpendicularly on top of the transparent sheet material, with their optical aperture facing each other at the same location coordinates on opposite sides of the glass. In implementations, mounts may be included that support the OCs thereby keeping them upright and perpendicular to the glass. Each pair of OCs may be coupled to an optical source and optical meter, respectively, as described herein. Lateral adjustments in the x-y directions may then be made as needed to the upper OC to maximize amplitude coupling to the OC underneath for optimum alignment. A fine adjustment fixture may be used for greater control. Each of the remaining OC pairs may be aligned as needed.

On the top side of the glass, a form (mold) may be placed on the transparent material so that the OCs are near the center of the form. The form is of the desired shape of the ODU's and IDU's housing size and footprint. A chemical release agent may be applied to the inside perimeter surface of the form. Epoxy resin or similar liquid may be poured into the form to the desired depth. The epoxy resin may be filled around the OCs and its supports without disturbing the OC pairs becoming unaligned. The epoxy resin may be allowed to set, which then melds with the transparent sheet material to become the base plate for the IDU, with the aligned OCs positions locked in place. The transparent sheet provides a protective lens over the OCs aperture, as well as acts as a shield against environmental contaminants and moisture.

The glass may then be turned over a first time so that the bottom side becomes the top side and vice versa. An identical form is placed around the OCs on this side at the same precise location as the other form that is now on the bottom side of the glass. A chemical release agent may be applied to the inside perimeter surface of the form. Epoxy resin may be poured into the form to the desired depth. The epoxy resin may be filled around the OCs and its supports without disturbing the OC pairs becoming unaligned. The epoxy resin may be allowed to set, which then melds with the transparent sheet and becomes the base plate for the ODU, with the aligned OCs positions locked in place. The transparent sheet provides a protective lens over the OCs aperture, as well as acts as a shield against environmental contaminants and moisture.

In implementations, a desired number of magnets may be distributed and permanently glued in place around the perimeter of the ODU base plate. As described herein, these magnets will help to pull the ODU and IDU into their relative positions during the installation process onto a window. A polarity of each group of magnets may be consistent, e.g., all those along one side are N, while those along the other side may be S, to ensure proper orientation of the ODU relative to the IDU. ODU wireless power coupler coils may be placed around the OC to make efficient use of the real estate. Note the OCs may also be located outside of the coils if the application requires. Any necessary adjustments may be made to these coils to maximize power coupling efficiency with those for the IDU. The coils may be glued in place. In implementations, the magnets may be located inwards of the coils in the vicinity of the OCs. This may allow for minimizing the base plate footprint to the size of the coils.

The glass may be turned back over, e.g., turned a second time, to have the IDU base plate back on top. The IDU wireless power coupler coils may be placed around the OCs. Any necessary adjustments may be made to these coils to maximize power coupling efficiency with those for the ODU. Apply glue to these coils to affix the base plate. Complementary-polarity magnets may be placed to mirror those glued to the ODU base plate. The magnets may be allowed to snap into place as they are drawn by the latter magnets. The magnets may be affixed to the IDU base plate. The arrangement of the magnets' polarity in this way will prevent the ODU and IDU from being mounted up-side-down.

Both base plates may be removed from the glass. The forms may be removed from both base plates. With the two base plates directly in contact with each other and held together by the magnets, any excess transparent sheet material that's beyond the base plates form factor may be trimmed to produce a base plate pair with identical and complementary footprints. A media converter, wireless modem, wi-fi router, power supply, and cabling equipment may be mounted onto base plates as appropriate, as described herein. The base plate assemblies may be mated to a housing cover to complete the ODU and IDU units. The ODU and IDU units may be checked by bringing them together on opposite sides of a window. Their magnets will be drawn together, with the OCs and wireless power coupler being aligned and functional.

FIG. 1 is an example block diagram of an architecture for a window mounted wireless (Wi-Fi) gateway system 100 according to some implementations. In the current example, the window mounted Wi-Fi gateway system 100 includes an indoor unit 102 and an outdoor unit 104. The indoor unit 102 and the outdoor unit 104 may be aligned on opposing sides (e.g., the interior and exterior, respectively) of window 106 having one or more panes of glass, such as an interior pane 108 and an exterior pane 110 illustrated in the current example. The alignment may be configured such that one or more transmitters operating in multiple frequency bands of the indoor unit 102 align with one or more receivers of the exterior unit 104 and one or more receivers of the indoor unit 102 align with one or more transmitters of the exterior unit 104. For instance, an optical receiver of the indoor unit 102 may align with an optical transmitter of the outdoor unit 104 and an optical receiver of the outdoor unit 104 may align with an optical transmitter of the indoor unit 102.

In the current example, the outdoor unit 104 may be in wireless communication with a network 112, such as a mobile network providing high speed wireless internet services to an end-user. In this manner, the outdoor unit 104 may be configured to receive incoming data via RF signals 114 received from the network 112 and to transmit outgoing data via RF signals 114 sent to the network 112. Likewise, the indoor unit 102 may be in wireless communication with one or more UEs 116, such as smart phones, televisions, smart appliances, tablets, personal computers, and the like associated with the end-user. In this manner, the indoor unit 102 may be configured to receive outgoing data via wireless signals 118 received from the UEs 116 and to transmit incoming data via wireless signals 118 sent to the UEs 116.

In some cases, the alignment between the indoor unit 102 and the outdoor unit 104 may be configured to accommodate one or more coatings applied to the window 106 (e.g., a low-energy coating, tint, argon gas layer, or the like). In this manner, the system 100 may be configured to provide an installation or set-up assistant, such as via a paired downloadable application on a UE 116. For instance, as one illustrative example, a user may apply or adhere the exterior unit 104 to an exterior of a window 106 of their home environment. The user may also download an application to the UE 116. The user may also pair the application hosted on the UE 116 to the interior unit 102 (such as over a home network, Bluetooth, or the like).

The application may then present an alignment graphic or interface on a display of the UE 116 that may assist with aligning the indoor unit 102 with the exterior unit 104. For example, the interface may include a cursor or pointer that represents the interior unit 102 that may move on the interface as the user moves the indoor unit 102. The interface may also present a target that represents the exterior unit 104. In this manner, the user may move the cursor to the target by moving the indoor unit 102 with respect to the window 106 and the outdoor unit 104. The interface may, upon proper alignment (e.g., signal received and/or sent between the indoor unit 102 with the exterior unit 104 greater than one or more thresholds), display an aligned indicator (such as a green indicator) to inform the user to adhere the indoor unit 102 to the window 106 at the current alignment. In this manner, the system 100 may accommodate alignment that may be more complicated than aligning the exteriors of the two units 102 and 104, such as caused by any optical transmission interference that occurs due to coatings, gasses, tinting and the like.

Figure 2:
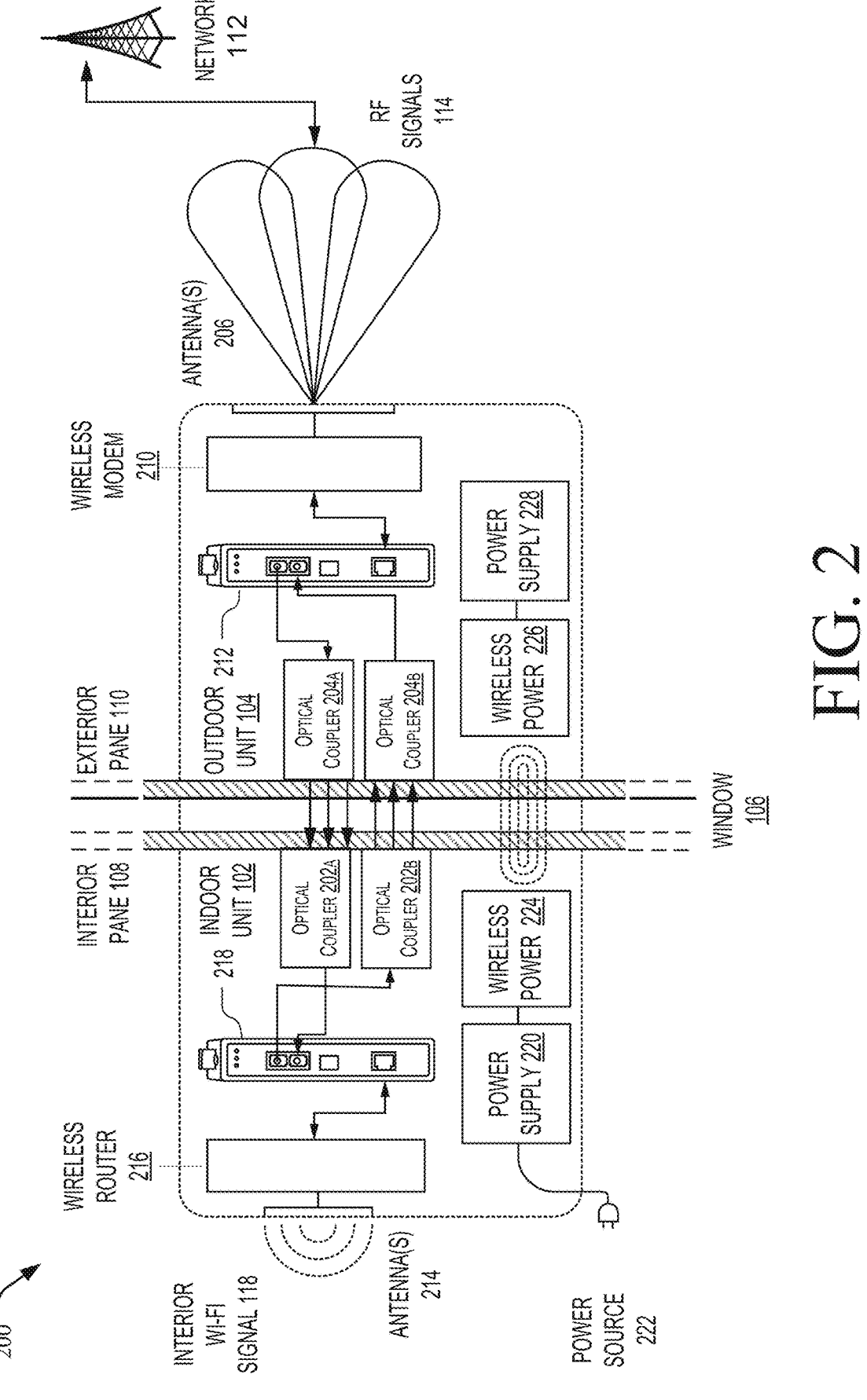
FIG. 2 is another example block diagram of an architecture for a window mounted wireless gateway system, according to some implementations.

FIG. 2 is an example block diagram of an architecture for a window mounted wireless (Wi-Fi) gateway system 200 according to some implementations. In the current example, the window mounted Wi-Fi gateway system 200 includes the indoor unit 102 and the outdoor unit 104. As previously described, the indoor unit 102 and the outdoor unit 104 may be aligned (as described with respect to FIG. 1) on opposing sides (e.g., the interior and exterior, respectively) of the window 106 having one or more panes of glass (such as the interior pane 108 and the exterior pane 110 illustrated in the current example).

The alignment may be configured such that a first optical coupler 202*a* (or transducer, collimator, or the like) of the indoor unit 102 aligns with a first optical coupler 204*a* (or transducer, collimator, or the like) of the exterior unit 104, such that data may be transmitted from the first optical coupler 204*a* of the exterior unit 104 to the first optical coupler 202*a* of the indoor unit 102. Likewise, a second optical coupler 202*b* of the indoor unit 102 aligns with a second optical coupler 204*b* of the exterior unit 104, such that data may be transmitted from the second optical coupler 202*b* of the indoor unit 102 to the second optical coupler 204*b* of the exterior unit 104. For instance, the optical couplers 202*a* and 202*b* may output the data as an optical-based signal that may be received by the optical couplers 204*a* and 204*b*, respectively. While FIG. 2 illustrates two optical coupler pairs (202*a*, 204*a*; 202*b*, 204*b*), it is to be understood that the example of FIG. 2 may include only one optical coupler pair or may include more than two optical coupler pairs.

The outdoor unit 104 may also include one or more antenna(s) 206 positioned with respect to an antenna aperture. The antenna(s) 206 may be coupled to a wireless modem 210 and/or media converter 212. The wireless modem 210 may be configured to decode the RF signals received by the antennas 206 from one or more networks, such as network 112 of FIG. 1. The wireless modem 210 and/or media converter 212 may be in electronic communication with the optical couplers 204*a* and 204*b*. In the current example, the antenna 206 may be a beam forming antenna that may direct the coverage of the system 200 in a desired direction or configuration with respect to the network 112.

In the current example, the antenna(s) 206 may be configured to provide beam forming to improve signal reception and/or transmission with respect to omnidirectional antenna responses and the RF signals 114. In some cases, the antenna(s) 206 may include multiple antennas that are configured to have adjustable phase and amplitude to generate beam or focused area of coverage. In the focused area of coverage, the antenna(s) 206 may provide increased signal strength and/or range, improved signal quality, and otherwise enhanced network capabilities. In these examples, the antenna(s) 206 may be adjusted to have a beam shaped in the direction of a nearest proximate cellular tower or the like.

The indoor unit 102 may include one or more antenna(s) 214 positioned with respect to an antenna aperture. The antenna(s) 214 may be coupled to a wireless router 216. The wireless router 216 of the indoor unit 102 may be configured to decode the interior Wi-Fi signals 118 received by the antenna(s) 214 from, for instance, a UE within the interior environment. The wireless router 216 may be in electronic communication with the optical couplers 202*a* and 202*b*.

In the current example, the indoor unit 102 may include a converter 218 (such as a media converter or the like) to decode and/or translate interior Wi-Fi signals 118 (such as representative of media files) and/or signals (such as representative of media files) received from the optical coupler 202*a* prior to delivering to the wireless router 216. Likewise, the outdoor unit 104 may include the converter 212 (such as a media converter or the like) to decode and/or translate RF signals 114 (such as representative of media files) and/or signals (such as representative of media files) received from the optical coupler 204*a*.

As described with respect to FIG. 2, the indoor unit 102 may also include a power supply 220 that may be coupled to a power source 222 (such as an outlet in the interior environment). The power supply 220 may provide power to the indoor unit 102 and act as a power source for the outdoor unit 104. For instance, the power supply 220 may be coupled to a wireless power transmitter 224 to output a power signal such as an inductive power supply signal. The outdoor unit 104 may be equipped with a wireless power receiver 226 that may be charged by or capture the inductive power supply signal. The wireless power receiver 226 may be coupled to a power supply 228 of the outdoor unit 104. In implementations, the wireless power transmitter 224 and wireless power receiver 226 may be in the form of cooperating coils. The IDU 102 may include a housing cover 230 and the ODU 104 may include a housing cover 232.

Referring to FIGS. 3, 4A, 4B, 5A, and 5B, a fabrication process for window mounted Wi-Fi gateway systems, e.g., window mounted Wi-Fi gateway systems 100 and 200, may be described. It is to be understood that the fabrication process may be used to fabricate other examples of window mounted Wi-Fi gateway systems.

Figure 3:
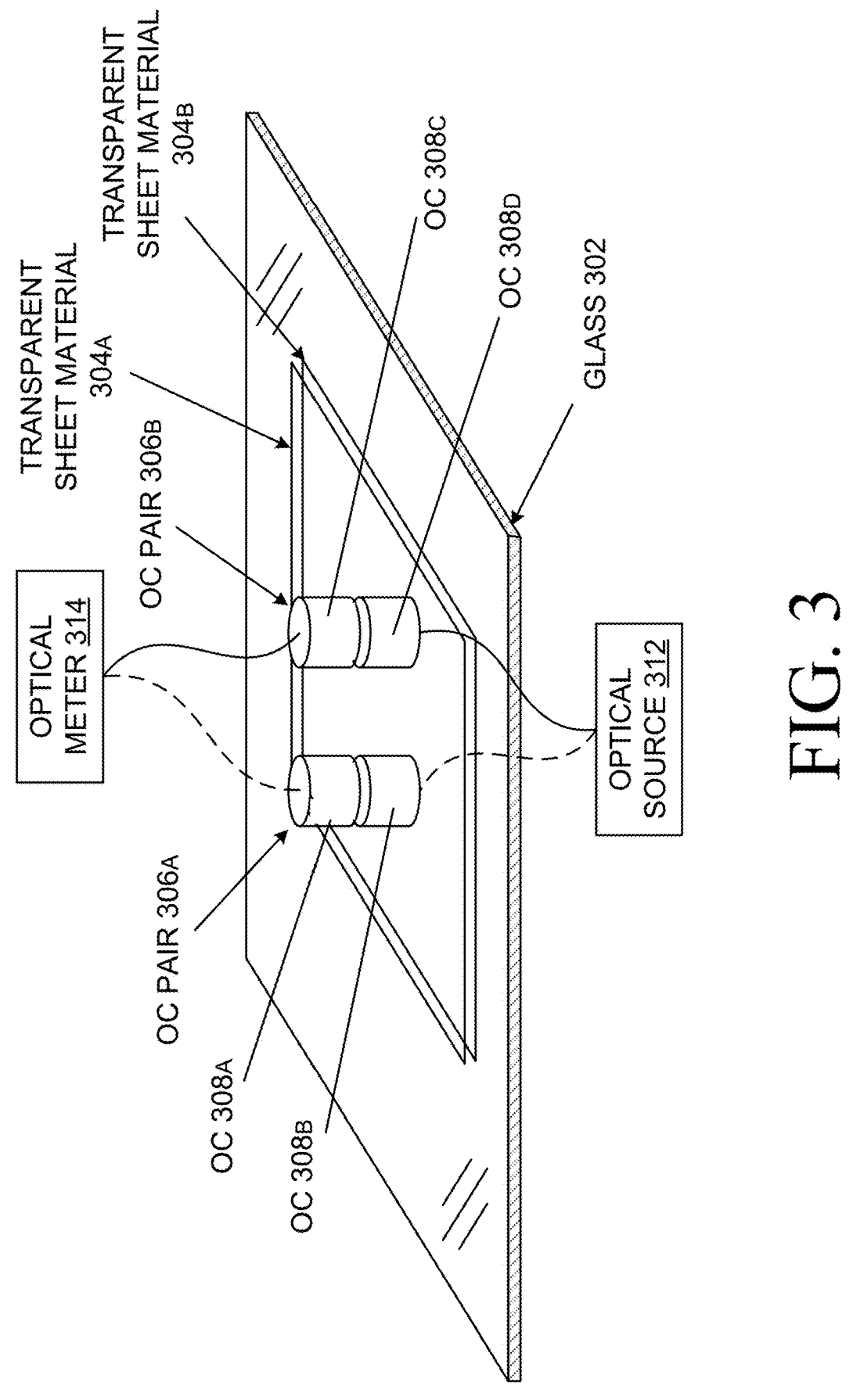
FIGS. 3, 4A, 4B, 5A, and 5B schematically illustrate various stages of an example process associated with fabricating a window mounted wireless gateway system according to some implementations.

As can be seen in FIG. 3, the fabrication process for window mounted Wi-Fi gateway systems, described herein, may begin by horizontally orienting a sheet of glass 302 that serves as a substantially flat platform large enough to accommodate the footprint of the window mounted Wi-Fi gateway system, with some room to spare on all sides. In implementations other transparent materials, e.g., plastic, may be used in place of glass as the platform. The surface of the glass 302 is referred to herein as the x-y plane. A transparent sheet material 304a, 304b, e.g., Gorilla® glass or a resin-based compound material, may be temporarily applied to both the top and bottom sides of the glass 302 in the x-y plane. In implementations, the size of this transparent sheet material 304 is larger than the footprint of the window mounted Wi-Fi gateway system.

OC pair(s) 306a, 306b may be placed perpendicularly on top sides of the transparent sheet material 304, with their optical aperture facing each other at the same location coordinates on opposite sides of the glass 302. The OC pairs 306a, 306b may be held in place with rails or clamps attached to a mechanical arm. OC pair 306a includes OCs 308a, 308b, and OC pair 306b includes OCs 308c, 308d. While only two pairs 306a, 306b are illustrated in the example of FIG. 3, it is to be understood that more or fewer OC pairs may be included in window mounted Wi-Fi gateway systems depending on the requirements. In implementations, mounts may be included that support the OCs of the OC pairs 306a, 306b thereby keeping them upright and perpendicular to the glass 302. The mounts may be made of any suitable material, e.g., plastic.

Each OC pair 306a, 306b may be coupled to an optical source 312 and an optical meter 314. Based on signals from the optical source 312 received at the optical meter 314 after travelling through the OC pairs 306a, 306b, lateral adjustments in the x-y directions may then be made as needed to the corresponding upper OC 308a, 308c of the OC pairs 306a, 306b to maximize amplitude coupling to the corresponding lower OC 308b, 308d of the OC pairs 306a, 306b for optimum alignment. A fine adjustment fixture may be used for greater control. Each of any remaining OC pairs may be aligned and adjusted as needed.

Figure 4A:
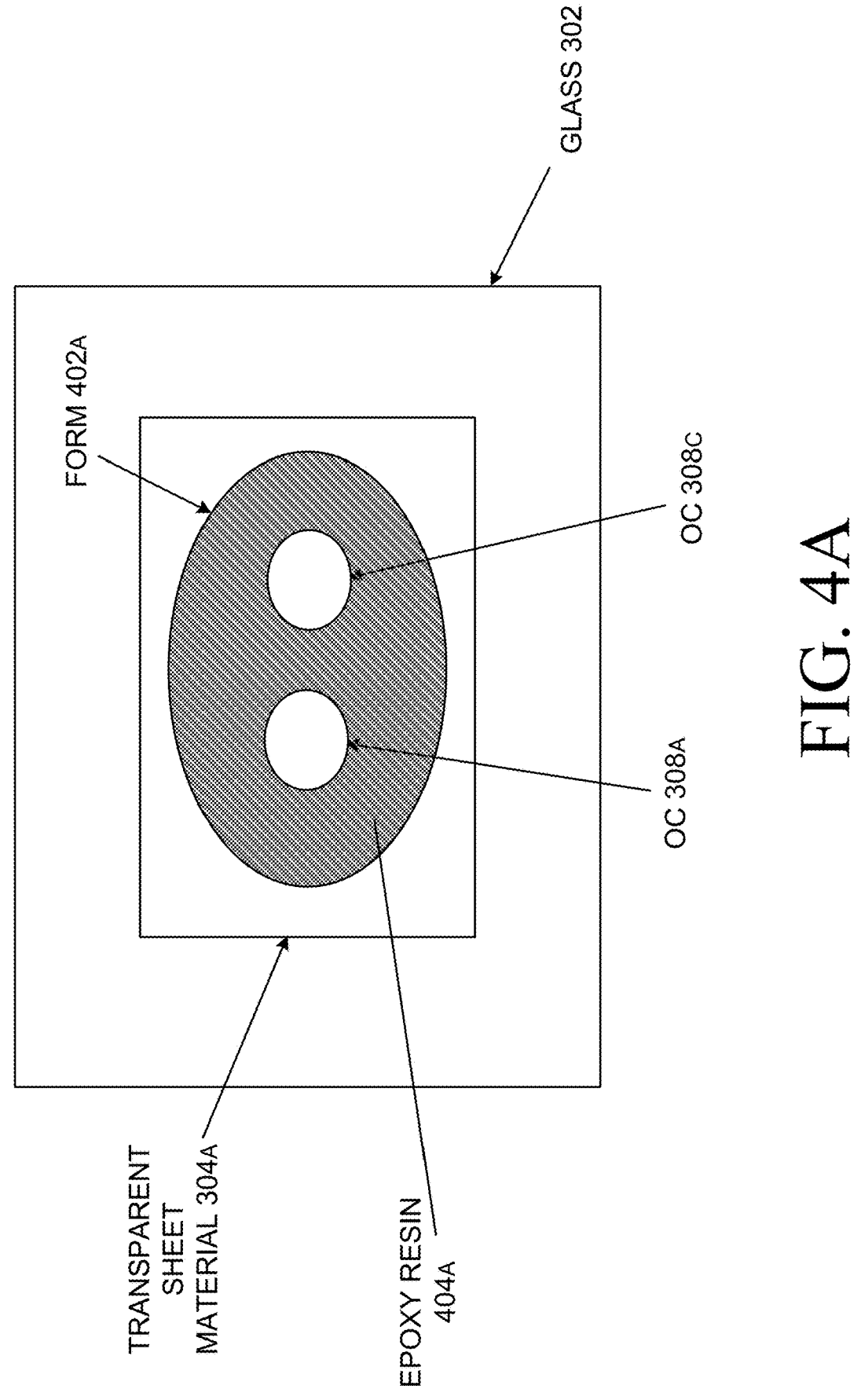

Referring to FIG. 4A, on the top side of the glass 302, a form (mold) 402a may be placed on the transparent sheet material 304 so that corresponding OCs 308a, 308c of the OC pairs 306a, 306b are near the center of the form 402a. The form 402a is of the desired shape of the ODU's and IDU's housing size and footprint. While the form 402a illustrated in FIG. 4 is oval, the form 402a may be any other shape large enough to house all the components needed inside the window mounted Wi-Fi gateway systems.

A chemical release agent may be applied to an inside perimeter surface of the form 402a. A stabilizer, e.g., an epoxy resin 404a (or similar liquid), may be deposited into the form to the desired depth. The epoxy resin 404a may be filled around the OCs 308a, 308c and any supports 310 without disturbing the OCs 308a, 308c such that they become unaligned within the OC pairs 306a, 306b. The epoxy resin 404a may be allowed to set, which then melds with the transparent sheet material 304a to become the base plate for the IDU, with the aligned OCs' positions locked in place. The transparent sheet material 304a provides a protective lens over the OCs' 308a, 308c aperture of, as well as acts as a shield against environmental contaminants and moisture.

Figure 4B:
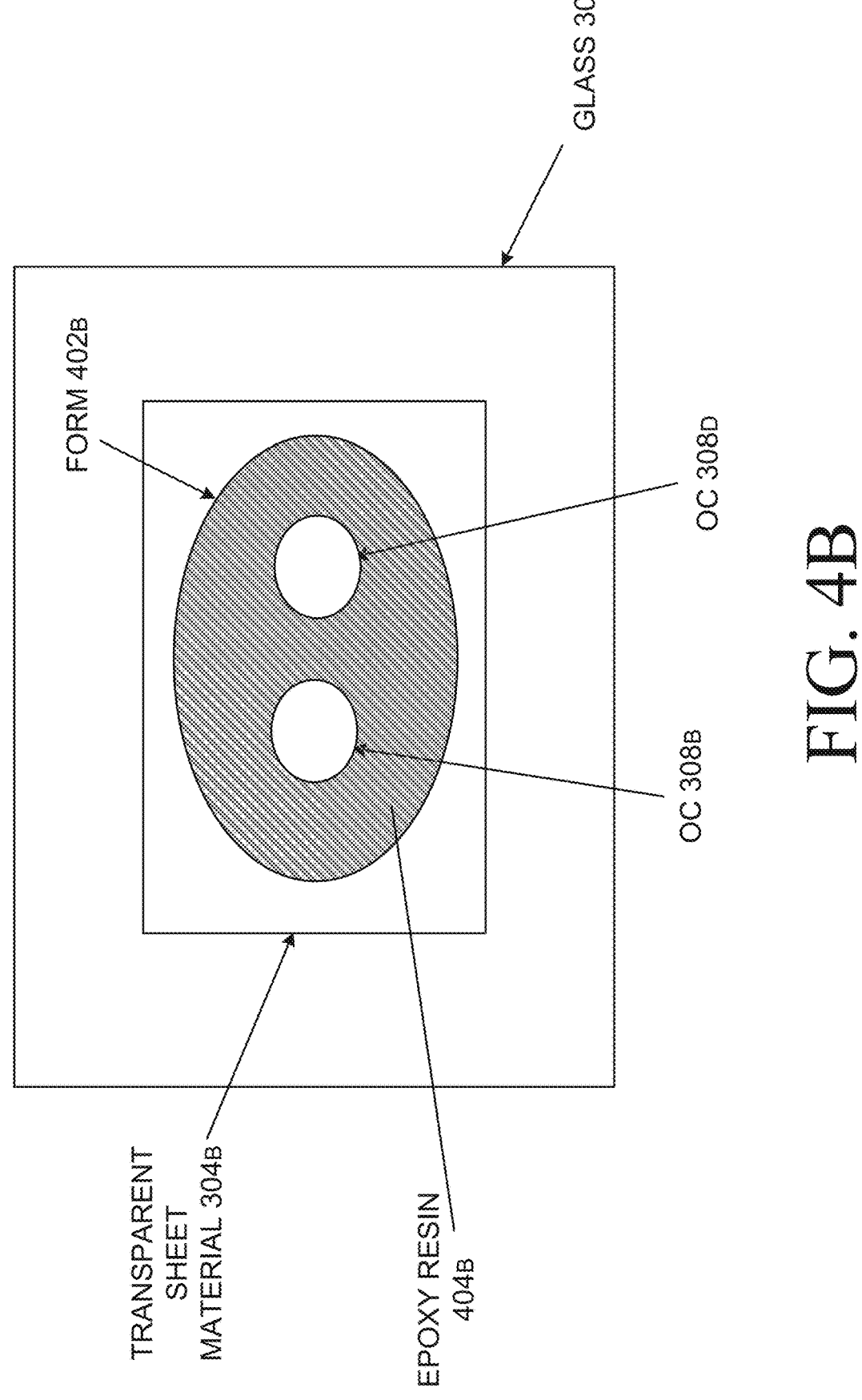

Referring to FIG. 4B, the glass 302 may then be turned over a first time so that the bottom side becomes the top side and vice versa. An identical form 402b is placed around the OCs 308b, 308d on this side at the same precise location as the other form 402a that is now on the bottom side of the glass 302. A chemical release agent may be applied to the inside perimeter surface of this second form 402b. A stabilizer, e.g., an epoxy resin 404b (or similar liquid), may be deposited into the second form 402b to the desired depth. The epoxy resin 404b may be filled around the OCs 308b, 308d and any supports 310 without disturbing the OCs 308b, 308d such that they become unaligned within the OC pairs 306a, 306b. The epoxy resin 404b may be allowed to set, which then melds with the transparent sheet material 304b to become the base plate for the ODU, with the aligned OCs' positions locked in place. The transparent sheet material 304b provides a protective lens over the OCs' 308b, 308d aperture, as well as acts as a shield against environmental contaminants and moisture.

Figure 5A:
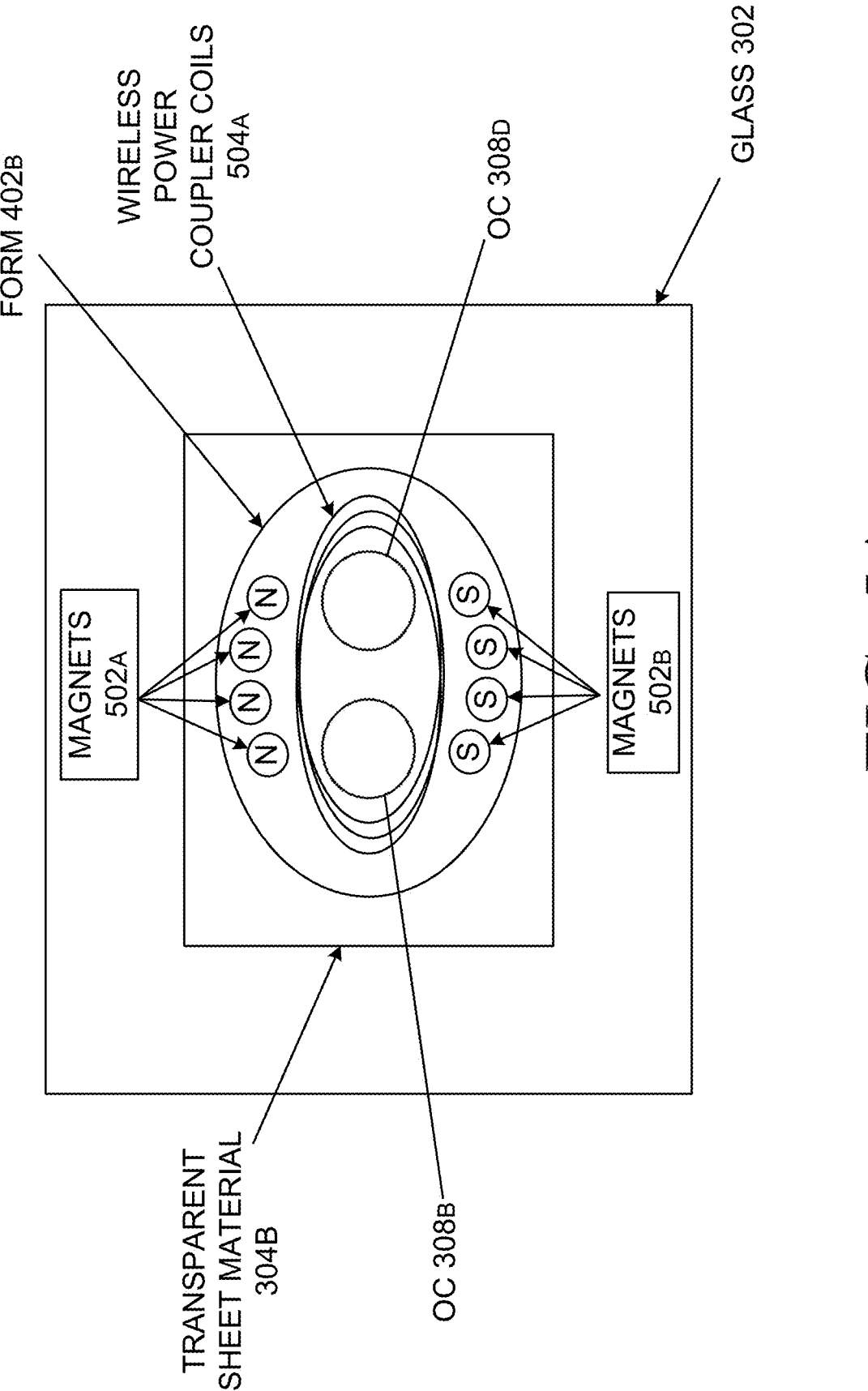

Referring to FIG. 5A, in implementations, a desired number of magnets 502a, 502b may be distributed in two groups and permanently glued in place around the perimeter of the ODU base plate, e.g., first and second sections of the transparent sheet material 304b, on the epoxy resin 404b (not illustrated in FIG. 5A. As described herein, these magnets 502a, 502b will help to pull the ODU and IDU into their relative positions during the installation process onto a window. A polarity of each group of magnets may be consistent, e.g., all those along one side are N, while those along the other side may be S, to ensure proper orientation of the ODU relative to the IDU. ODU wireless power coupler coils 504a may be placed around the OCs 308b, 308d of the OC pairs 306a, 306b to make efficient use of the real estate of the transparent sheet material 304b. Note the OCs 308b, 308d may also be located outside of the wireless power coupler coils 504a if the application requires. Any necessary adjustments may be made to these wireless power coupler coils 504a to maximize power coupling efficiency with those for the IDU. The wireless power coupler coils 504a may be glued in place. In implementations, the magnets 502a, 502b may be located inwards of the wireless power coupler coils 504a in the vicinity of the OCs 308b, 308d. This may allow for minimizing the base plate footprint to the size of the coils.

Figure 5B:
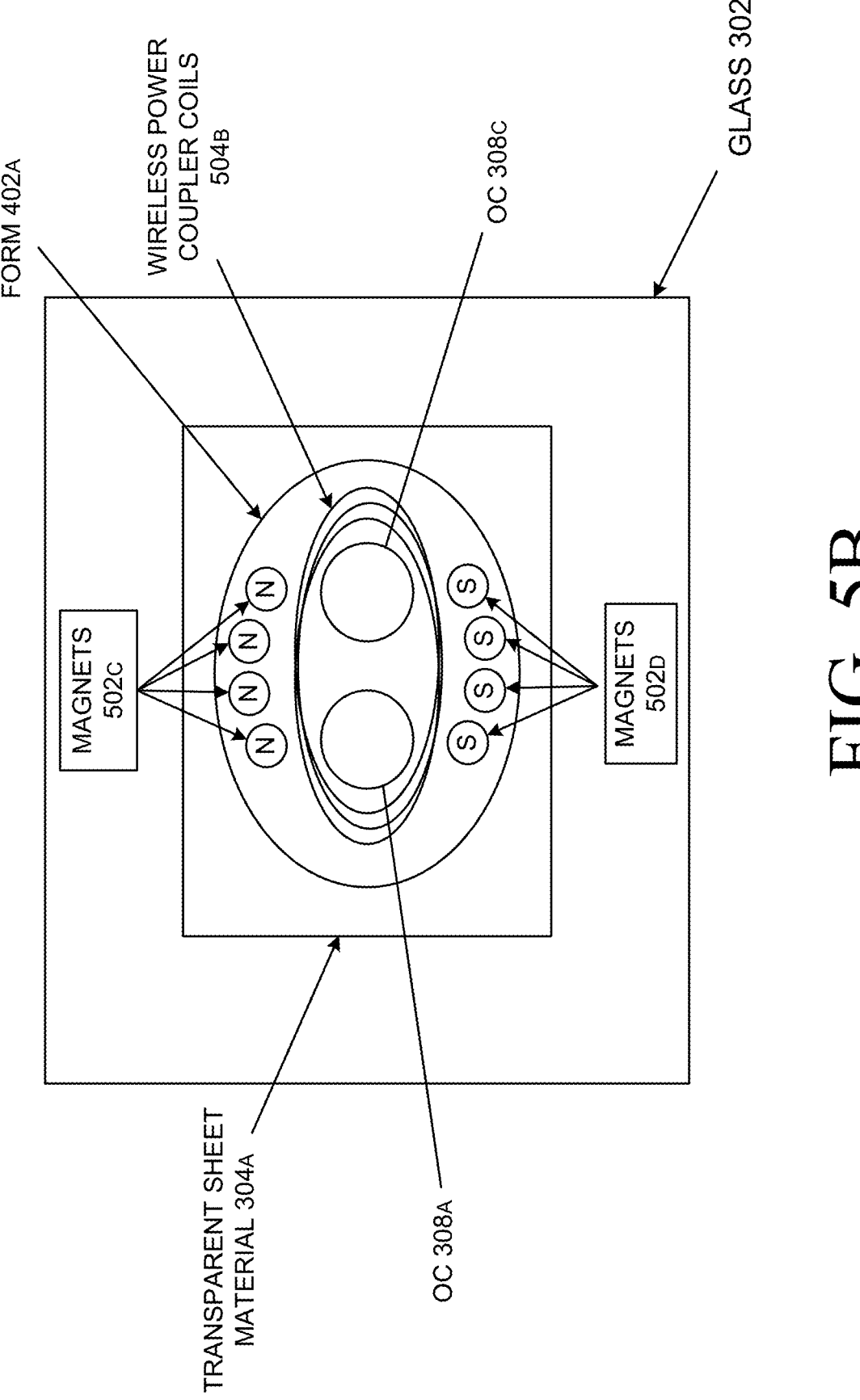

Referring to FIG. 5B, the glass 302 may be turned back over, e.g., turned a second time, to have the IDU base plate back on top, e.g., the transparent sheet material 304a. The IDU wireless power coupler coils 504b may be placed around the OCs 308a, 308c of the OC pairs 306a, 306b. Any necessary adjustments may be made to these IDU wireless power coupler coils 504b to maximize power coupling efficiency with those for the ODU. Glue may be applied to these IDU wireless power coupler coils 504b to affix them to the base plate, e.g., the form 402a and the transparent sheet material 304a. Thus, during operation of the window mounted Wi-Fi gateway system, the IDU wireless power coupler coils 504b and the ODU wireless power coupler coils 504a may serve as cooperating coils to provide wireless power transmitter 224 and wireless power receiver 226.

Complementary-polarity magnets 502c, 502d may be placed to mirror those glued to the ODU base plate on the epoxy resin 404a (not illustrated in FIG. 5B). The magnets 502c, 502d may be allowed to snap into place as they are drawn by the latter magnets. The magnets 502c, 502d may be affixed to the IDU base plate. The arrangement of the magnets' polarity in this way will prevent the ODU and IDU from being mounted up-side-down. In implementations, the magnets 502c, 502d may be located inwards of the wireless power coupler coils 504b in the vicinity of the OCs 308a, 308c. This may allow for minimizing the base plate footprint to the size of the coils.

Both base plates, e.g., transparent sheet material 304a and 304b may be removed from the glass 302. The forms 402a, 402b may be removed from both base plates, e.g., the transparent sheet material 304a, 304b. With the two base plates directly in contact with each other and held together by the magnets, any excess transparent sheet material that's beyond the base plates form factor may be trimmed to produce a base plate pair with identical and complementary footprints. Media converters, e.g., media converters 212, 218, wireless modems, e.g., wireless modem 210, Wi-Fi routers, e.g., wireless router 216, power supplies, e.g., power supplies 220, 228, and cabling equipment may be mounted onto base plates (e.g., transparent sheet material 304a, 304b) as appropriate, as described herein. The base plate assemblies may each be mated to a housing cover, e.g., housing covers 230, 232, to complete the IDU and ODU units, e.g., IDU 102 and ODU 104. The ODU and IDU units may be checked by bringing them together on opposite sides of a window. Their magnets 502a, 502b, 502c, 502d will be drawn together, with the OCs and wireless power couplers being aligned and functional.

Figure 6B:
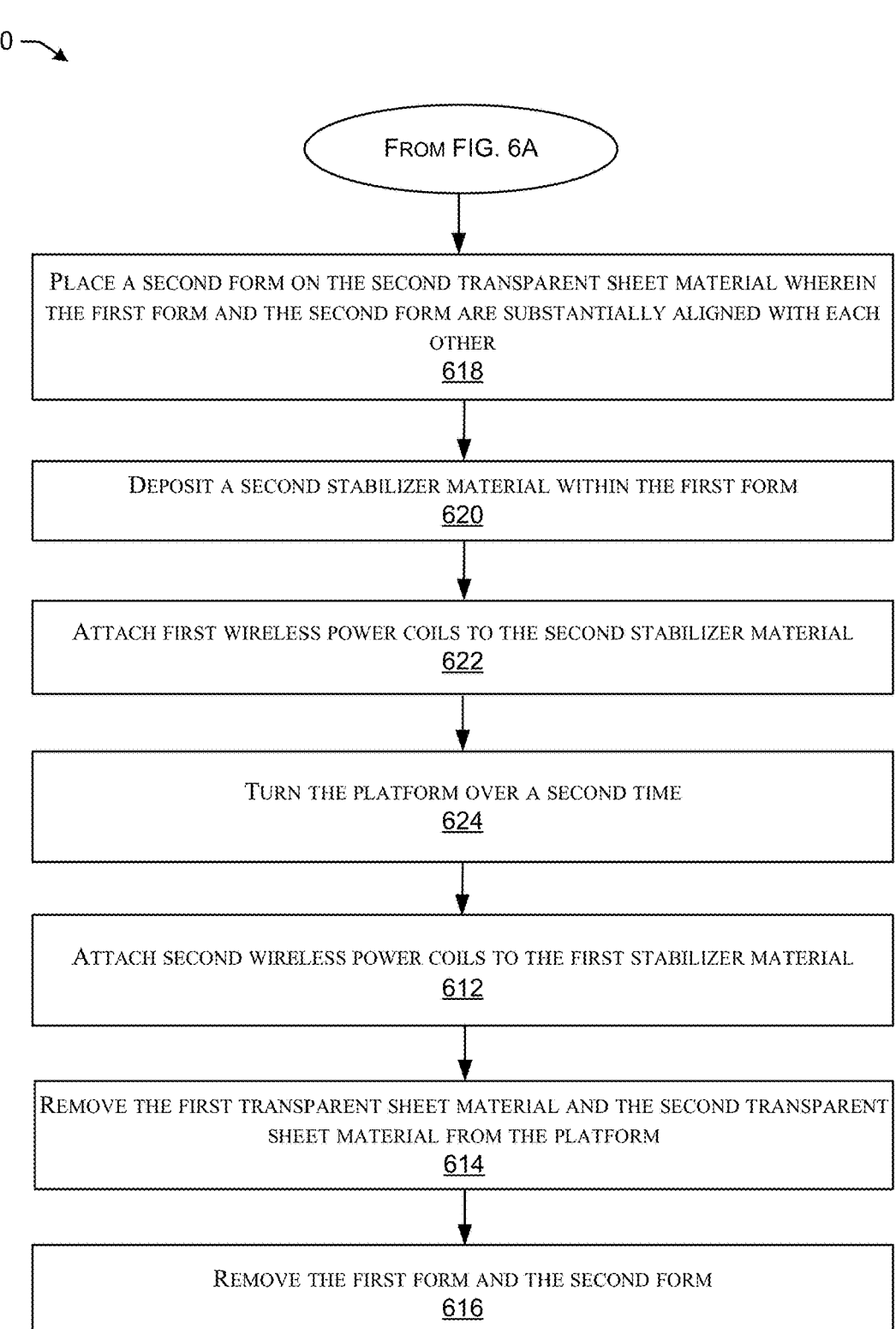

FIGS. 6A and 6B are a flow diagram illustrating an example fabrication process associated with the window mounted Wi-Fi gateway systems described herein. The process is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, when executed by one or more processor(s), performs the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIGS. 6A and 6B are a flow diagram illustrating an example process 600 associated with fabricating at least a portion of a window mounted Wi-Fi gateway system that may include an indoor unit mounted on an interior of a window and an exterior unit mounted on the exterior of the window. The indoor and outdoor units may be aligned such that the units may send and receive data from each other through the windowpanes. Accordingly, unlike conventional repeaters, the window mounted Wi-Fi gateway system extends the mobile internet coverage indoors without introducing interference in the outdoor environment.

At 602, a transparent and substantially flat platform is oriented in a horizontal orientation. For example, as can be seen in FIG. 3, the fabrication process for window mounted Wi-Fi gateway systems, described herein, may begin by horizontally orienting a sheet of glass 302 that serves as a substantially flat platform large enough to accommodate the footprint of the window mounted Wi-Fi gateway system, with some room to spare on all sides. In implementations other transparent materials, e.g., plastic, may be used in place of glass as the platform.

At 604, a first transparent sheet material is applied to a first side of the platform. At 606, a second transparent sheet material is applied to a second side of the platform. For example, a transparent sheet material 304a, 304b, e.g., Gorilla® glass or a resin-based compound material, may be temporarily applied to both the top and bottom sides of the glass 302 in the x-y plane. In implementations, the size of this transparent sheet material 304 is larger than the footprint of the window mounted Wi-Fi gateway system.

At 608, a first optical coupler (OC) is placed perpendicularly on the first transparent sheet material. At 610, a second OC is placed perpendicularly on the second transparent sheet material, wherein the first OC and the second OC are aligned with each other. For example, OC pair(s) 306a, 306b may be placed perpendicularly on top sides of the transparent sheet material 304, with their optical aperture facing each other at the same location coordinates on opposite sides of the glass 302. The OC pairs 306a, 306b may be held in place with rails or clamps attached to a mechanical arm. OC pair 306a includes OCs 308a, 308b, and OC pair 306b includes OCs 308c, 308d. While only two pairs 306a, 306b are illustrated in the example of FIG. 3, it is to be understood that more or fewer OC pairs may be included in window mounted Wi-Fi gateway systems depending on the requirements. In implementations, mounts may be included that support the OCs of the OC pairs 306a, 306b thereby keeping them upright and perpendicular to the glass 302. The mounts may be made of any suitable material, e.g., plastic.

At 612, a first form is placed on the first transparent sheet material. For example, referring to FIG. 4A, on the top side of the glass 302, a form (mold) 402a may be placed on the transparent sheet material 304 so that corresponding OCs 308a, 308c of the OC pairs 306a, 306b are near the center of the form 402a. The form 402a is of the desired shape of the ODU's and IDU's housing size and footprint. While the form 402a illustrated in FIG. 4 is oval, the form 402a may be any other shape large enough to house all the components needed inside the window mounted Wi-Fi gateway systems.

At 614, a first stabilizer material is deposited within the first form. For example, a stabilizer, e.g., an epoxy resin 404a (or similar liquid), may be deposited into the form to the desired depth. The epoxy resin 404a may be filled around the OCs 308a, 308c and any supports 310 without disturbing the OCs 308a, 308c such that they become unaligned within the OC pairs 306a, 306b. The epoxy resin 404a may be allowed to set, which then melds with the transparent sheet material 304a to become the base plate for the IDU, with the aligned OCs' positions locked in place. The transparent sheet material 304a provides a protective lens over the OCs' 308a, 308c aperture of, as well as acts as a shield against environmental contaminants and moisture.

At 616, the platform is turned over a first time. For example, referring to FIG. 4B, the glass 302 may then be turned over a first time so that the bottom side becomes the top side and vice versa.

At 618, a second form is placed on the second transparent sheet material wherein the first form and the second form are substantially aligned with each other. For example, an identical form 402*b* is placed around the OCs 308*b*, 308*d* on this side at the same precise location as the other form 402*a* that is now on the bottom side of the glass 302.

At 620, a second stabilizer material is deposited within the first form. For example, a stabilizer, e.g., an epoxy resin 404*b* (or similar liquid), may be deposited into the second form 402*b* to the desired depth. The epoxy resin 404*b* may be filled around the OCs 308*b*, 308*d* and any supports 310 without disturbing the OCs 308*b*, 308*d* such that they become unaligned within the OC pairs 306*a*, 306*b*. The epoxy resin 404*b* may be allowed to set, which then melds with the transparent sheet material 304*b* to become the base plate for the ODU, with the aligned OCs' positions locked in place. The transparent sheet material 304*b* provides a protective lens over the OCs' 308*b*, 308*d* aperture, as well as acts as a shield against environmental contaminants and moisture.

At 622, first wireless power coils are attached to the second stabilizer material. For example, ODU wireless power coupler coils 504*a* may be placed around the OCs 308*b*, 308*d* of the OC pairs 306*a*, 306*b* to make efficient use of the real estate of the transparent sheet material 304*b*. Note the OCs 308*b*, 308*d* may also be located outside of the wireless power coupler coils 504*a* if the application requires. Any necessary adjustments may be made to these wireless power coupler coils 504*a* to maximize power coupling efficiency with those for the IDU. The wireless power coupler coils 504*a* may be glued in place.

At 624, the platform is turned over a second time. Referring to FIG. 5B, the glass 302 may be turned back over, e.g., turned a second time, to have the IDU base plate back on top, e.g., the transparent sheet material 304*a*.

At 626, second wireless power coils are attached to the first stabilizer material. For example, the IDU wireless power coupler coils 504*b* may be placed around the OCs 308*a*, 308*c* of the OC pairs 306*a*, 306*b*. Any necessary adjustments may be made to these IDU wireless power coupler coils 504*b* to maximize power coupling efficiency with those for the ODU. Glue may be applied to these IDU wireless power coupler coils 504*b* to affix them to the base plate, e.g., the form 402*a* and the transparent sheet material 304*a*. Thus, during operation of the window mounted Wi-Fi gateway system, the IDU wireless power coupler coils 504*b* and the ODU wireless power coupler coils 504*a* may serve as cooperating coils to provide wireless power transmitter 224 and wireless power receiver 226.

At 628, the first transparent sheet material and the second transparent sheet material are removed from the platform. For example, both base plates, e.g., transparent sheet material 304*a* and 304*b* may be removed from the glass 302.

At 630, the first form and the second form are removed. the forms 402*a*, 402*b* may be removed from both base plates, e.g., the transparent sheet material 304*a*, 304*b*. Any excess transparent sheet material that's beyond the base plate form factor may be trimmed.

While the example clauses described above are described with respect to one particular implementation, it should be understood that, in the context of this document, the content of the example clauses can also be implemented via a method, device, system, a computer-readable medium, and/or another implementation. Additionally, any of examples may be implemented alone or in combination with any other one or more of the other examples.

12

What is claimed is:

1. A method of fabricating at least a portion of a window mounted Wi-Fi gateway system, the method comprising:
   orienting a transparent and substantially flat platform in a horizontal orientation;
   applying a first transparent sheet material to a first side of the platform;
   applying a second transparent sheet material to a second side of the platform;
   placing a first optical coupler (OC) perpendicularly on the first transparent sheet material;
   placing a second OC perpendicularly on the second transparent sheet material, wherein the first OC and the second OC are aligned with each other;
   placing a first form on the first transparent sheet material;
   depositing a first stabilizer material within the first form;
   turning the platform over a first time;
   placing a second form on the second transparent sheet material wherein the first form and the second form are substantially aligned with each other;
   depositing a second stabilizer material within the first form;
   attaching first wireless power coils to the second stabilizer material;
   turning the platform over a second time;
   attaching second wireless power coils to the first stabilizer material;
   removing the first transparent sheet material and the second transparent sheet material from the platform; and
   removing the first form and the second form.

2. The method of claim 1, wherein the first transparent sheet material and the second transparent material comprise a resin-based material.

3. The method of claim 1, wherein the first stabilizer and the second stabilizer comprise an epoxy resin.

4. The method of claim 1, wherein the platform comprises one of glass or plastic.

5. The method of claim 1, further comprising:
   coupling an optical meter to the first OC;
   coupling an optical source to the second OC; and
   based on signals from the optical source received at the optical meter after travelling through the first OC and second OC, adjusting a position of at least one of the first OC or the second OC to maximize amplitude coupling between the first OC and the second OC.

6. The method of claim 1, further comprising:
   prior to depositing the first stabilizer material within the first form, applying a chemical release agent to the first form; and
   prior to depositing the second stabilizer material within the second form, applying a chemical release agent to the second form.

7. The method of claim 1, further comprising:
   prior to removing the first transparent sheet material and the second transparent sheet material from the platform, attaching a first group of magnets to a first section of the first stabilizer material;
   prior to removing the first transparent sheet material and the second transparent sheet material from the platform, attaching a second group of magnets to a second section of the first stabilizer material;
   prior to removing the first transparent sheet material and the second transparent sheet material from the platform, attaching a third group of magnets to a first section of the second stabilizer material; and prior to removing the first transparent sheet material and the second transparent sheet material from the platform, attaching a fourth group of magnets to a second section of the second stabilizer material.

8. The method of claim 7, further comprising:

mounting one or more media converters, wireless modems, Wi-Fi routers, power supplies, or cabling equipment to the first sheet material; and mounting one or more media converters, wireless modems, Wi-Fi routers, power supplies, or cabling equipment to the second transparent sheet material.

9. The method of claim 8, further comprising:

mating a first housing cover to the first transparent sheet material; and mating a second housing cover to the second transparent sheet material.

10. The method of claim 9, further comprising:

placing the first transparent sheet material against a first side of a window; and placing the second transparent sheet material against a second side of the window opposite the first transparent sheet material, wherein the first group of magnets and the third group of magnets is drawn together, and wherein the second group of magnets and the fourth group of magnets is drawn together.

* * * * *